United States Patent
Walters et al.

(10) Patent No.: US 11,695,645 B2
(45) Date of Patent: Jul. 4, 2023

(54) METHODS AND SYSTEMS FOR DYNAMIC RE-CLUSTERING OF NODES IN COMPUTER NETWORKS USING MACHINE LEARNING MODELS

(71) Applicant: Capital One Services, LLC, McLean, VA (US)

(72) Inventors: Austin Walters, McLean, VA (US); Mark Watson, McLean, VA (US); Galen Rafferty, McLean, VA (US); Jeremy Goodsitt, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/469,577

(22) Filed: Sep. 8, 2021

(65) Prior Publication Data

US 2023/0075894 A1    Mar. 9, 2023

(51) Int. Cl.
| | |
|---|---|
| *H04L 29/08* | (2006.01) |
| *H04L 41/16* | (2022.01) |
| *G06N 20/20* | (2019.01) |
| *H04L 41/12* | (2022.01) |
| *H04L 41/22* | (2022.01) |

(52) U.S. Cl.
CPC ............. *H04L 41/16* (2013.01); *G06N 20/20* (2019.01); *H04L 41/12* (2013.01); *H04L 41/22* (2013.01)

(58) Field of Classification Search
CPC .......... H04L 41/16; H04L 41/12; H04L 41/22
USPC ......................................................... 709/220
See application file for complete search history.

(56) References Cited

U.S. PATENT DOCUMENTS

| | | |
|---|---|---|
| 2017/0364831 A1 | 12/2017 | Ghosh et al. |
| 2019/0228855 A1* | 7/2019 | Leifer ................ G06Q 30/0269 |
| 2019/0325350 A1 | 10/2019 | Desai et al. |
| 2020/0175360 A1 | 6/2020 | Conti et al. |
| 2020/0349183 A1* | 11/2020 | Jayaraman .............. G06F 40/30 |
| 2020/0374308 A1 | 11/2020 | Chen et al. |

\* cited by examiner

*Primary Examiner* — Adnan M Mirza
(74) *Attorney, Agent, or Firm* — Perkins Coie LLP

(57) ABSTRACT

Methods and systems for the dynamically re-clustering of nodes in clusters to provide optimal performance and/or the most efficient use of resources through the use of machine learning models. Specifically, the methods and systems may determine a cluster that optimally performs and/or has the most efficient use of resources based on a first machine learning model. The methods and system may then retrieve available substitute nodes from other domains and/or networks that may lie outside the cluster, but may nonetheless be available to, or accessed by the cluster. The methods and systems may then generate an additional plurality of clusters using one or more of the original nodes of the originally selected clusters and/or one or more of the available substitute nodes.

20 Claims, 5 Drawing Sheets

METHODS AND SYSTEMS FOR DYNAMIC RE-CLUSTERING OF NODES IN COMPUTER NETWORKS USING MACHINE LEARNING MODELS

BACKGROUND

In recent years, the number of computers and applications available has exponentially increased. These computers and applications are routinely used in distributed manners. In a distributed manner, a single cluster of computers may be assigned a given task. The computers in the cluster therefore work in concert to optimally perform the task and/or use resources the most efficiently.

SUMMARY

Accordingly, methods and systems are described herein for improvements in the use of conventional clusters to perform tasks in computer networks. Specifically, the methods and systems describe the use of machine learning models for the re-clustering of nodes.

The methods and systems described herein solve this problem by dynamically re-clustering nodes in the clusters to provide optimal performance and/or the most efficient use of resources through the use of machine learning models. For example, the methods and systems may determine a cluster that optimally performs and/or has the most efficient use of resources based on a first machine learning model. The methods and system may then retrieve available substitute nodes (e.g., from other domains and/or networks) that may lie outside the cluster, but may nonetheless be available to, or accessed by the cluster. The methods and systems may then generate an additional plurality of clusters using one or more of the original nodes of the originally selected clusters and/or one or more of the available substitute nodes. The methods and systems may then apply a filtering criterion (e.g., a criterion indicating a requirement for providing optimal performance of a task and/or the most efficient use of resources) to both the original cluster (e.g., as determined by the first machine learning model) and the new clusters (e.g., based on one or more of the available substitute nodes). The methods and systems may then select a cluster (and/or nodes in the cluster) that best meets the filtering criterion. Moreover, methods and systems may perform these operations dynamically and continuously as conditions in the cluster, network, and/or availability of substitute nodes change.

Accordingly, the methods and systems allow the use of both topic modeling and topic classification models, but due to the specific architecture of the model provide additional benefits over each model individually. For example, through the use of a first model (e.g., a model that provides topics clusters corresponding to a user inputs), the system may quickly and accurately generate a cluster of items related to a user input. The system may then determine alternatives of the nodes within the clusters to generate additional sets of clusters. These original clusters and the new clusters may then be searched according to user criteria. By using this architecture, as opposed to simply searching for all node combinations of topics initially, the system provides a more efficient mechanism for reaching a non-original node combination. For example, the system may more efficiently determine that a node is not available, determine substitutes, filter the substitutes, and then output one, or a group of the most ideal substitute nodes.

In some aspects, the methods and systems disclosed herein describe the dynamic re-clustering of nodes in computer networks using machine learning models. For example, the system may receive a user request. The system may input the user request into a first machine learning model, wherein the first machine learning model is trained to determine one or more clusters of a first cluster subset that corresponds to one or more user requests. The system may determine a second cluster subset based on an output of the first machine learning model. The system may retrieve available substitute nodes. The system may generate a third cluster subset, wherein the third cluster subset is based on substituting one or more of the available substitute nodes with one or more nodes in one or more clusters of the second cluster subset. The system may receive a filtering criterion. The system may filter the second cluster subset and the third cluster subset based on the filtering criterion to determine a fourth cluster subset. The system may generate for display, on a user interface, a list of nodes in a cluster of the fourth cluster subset.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to source code programming.

Figure 1:
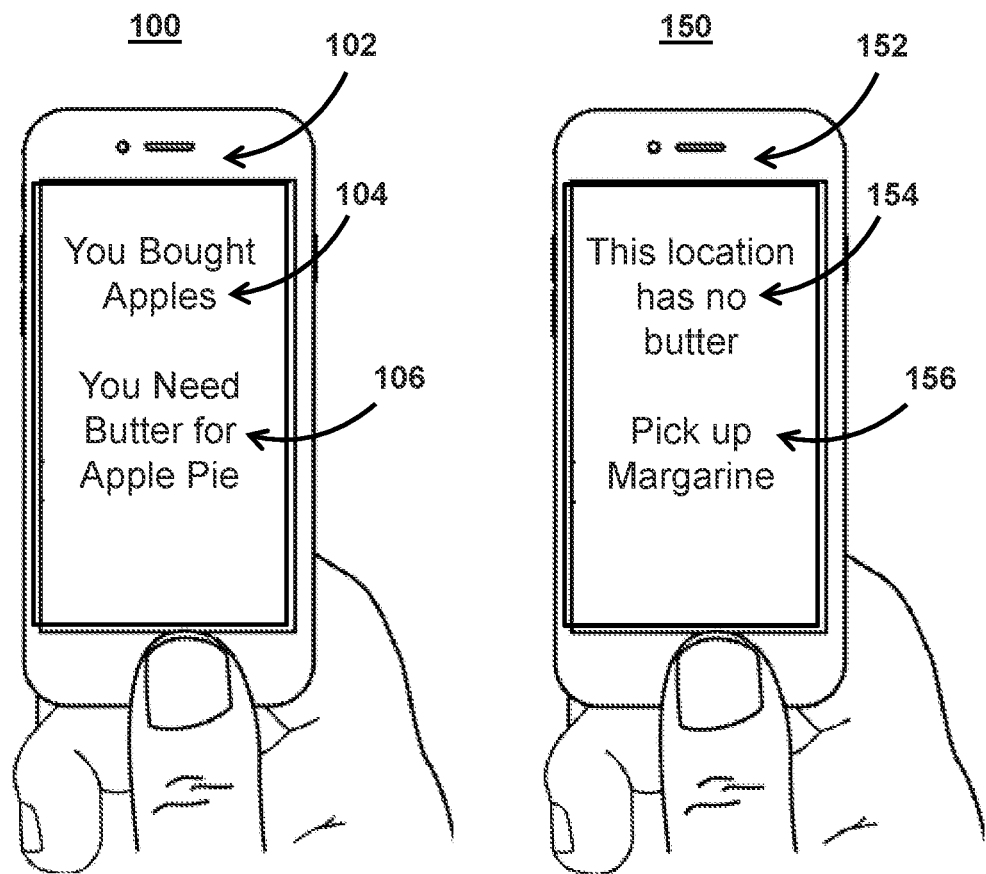
FIG. 1 shows a sample user interface for the dynamic re-clustering of nodes in computer networks using machine learning models, in accordance with one or more embodiments.

FIG. 1 shows an illustrative system for the dynamic re-clustering of nodes in computer networks using machine learning models, featuring a user interface, in accordance with one or more embodiments. For example, FIG. 1 shows systems 100 and 150. Systems 100 and 150 include user interfaces 102 and 152. User interfaces 102 and 152 may include displays. Information used to conduct operations using system 100 or system 150 may be collected by user interface 102 or 152.

For example, user interface 102 may be a mobile device (e.g., a cell phone, tablet, laptop, etc.) or another device that receives a user request. In some embodiments, the system may receive the user request from the user interface. The machine learning models may receive the information inputted into the user interface as an input. Additionally, or alternatively, a machine learning model may receive input from a third party (e.g., a server). For example, the system 100 may process the user request using the machine learning models to determine topic clusters (e.g., intents) that are related to the user input. The topic clusters may then be inputted into a second machine learning model to determine relevant nodes for each topic. Substitute nodes may then be generated using fuzzy logic and the substitute nodes may replace original nodes. These nodes and respective clusters may be filtered by a filtering criterion. The user interface may display the filtered nodes in an order that corresponds to their node score.

For example, in a non-limiting embodiment, the system may be used to determine substitute ingredients using fuzzy logic, based on the ingredient's characteristics, and then output available substitutes to the user interface. For example, a user may enter "desserts" into user interface 102. System 100 may input the user request into a first machine learning algorithm. The first machine learning algorithm may output a cluster subset comprising: "Banana split," "Ice cream," and "Apple Pie." The cluster subset generated by the first machine learning model (e.g., the first cluster subset) may be inputted into a second machine learning model. The second machine learning model may output nodes for each cluster of the first cluster subset. In some embodiments, the second machine learning model may generate a second cluster subset. For example, the second machine learning model may generate the following nodes for Apple Pie: "flour," "butter," "apples," "sugar," and "cinnamon." The system may determine substitute nodes for the outputs of the second machine learning model. For example, using fuzzy logic, the system may determine two nodes to be identical even though the substance of the data or value of the nodes is not identical. For example, the system may determine, using fuzzy logic, that butter has the following substitutes: "margarine," "oil," "lard," and "ghee." The system may generate a plurality of new clusters where the substitute nodes have replaced some of the original nodes. For example, in one cluster the system may replace butter, an original node outputted by the second machine learning model, with margarine, in another cluster it may replace "butter" with "oil." The system may filter node results using the user's preference for margarine (e.g., the user's past purchases of margarine, user's geographic location, etc.). In some embodiments, the system may rank the substitute nodes and only replace an original node if the rank (e.g., node score) is above a threshold. Clusters and their respective nodes may be filtered using a filtering criterion. For example, the system may rank the butter substitutes in order of how their node characteristics align with the filtering criterion. For example, if the filtering criterion is price, the system may rank the substitute nodes in order "lard," then "oil," then "margarine," then "ghee" in order from cheapest to most expensive and then may remove "ghee" because its price exceeded a threshold. The remaining clusters and nodes may then be outputted onto the user interface in order of their respective cluster score. For example, the system may output the "Apple Pie" with the following ingredients "flour," "brown sugar," "margarine," "nutmeg," and "apples."

For example, in a non-limiting embodiment, the system may be used in a computer network to determine substitute nodes, using fuzzy logic, based on the node's characteristics and then output available substitutes to the computer network. For example, a computer network receives a computer domain request. System 100 may input the computer domain request into a first machine learning algorithm. The first machine learning algorithm may output a cluster subset comprising: "Computer Domain 1," "Computer Domain 2," and "Computer Domain 3." The cluster subset generated by the first machine learning model (e.g., the first cluster subset) may be inputted into a second machine learning model. The second machine learning model may output nodes for each cluster of the first cluster subset. In some embodiments, the second machine learning model may generate a second cluster subset. For example, the second machine learning model may generate the following nodes for Computer Domain 1: "physical network 1," "file server 1," and "database server 1." The system may determine substitute nodes for the outputs of the second machine learning model. For example, the system may determine that physical network 1 has the following substitutes: "virtual network 1," "virtual machine 1," and "hypervisor 1." The system may generate a plurality of new clusters where the substitute nodes have replaced some of the original nodes. For example, in one cluster the system may replace physical network 1, an original node outputted by the second machine learning model, with virtual network 1. The system may filter node results using the user's preference for virtual network 1 (e.g., the user's past use of the virtual switch). In some embodiments, the system may rank the substitute nodes and only replace an original node if the rank (e.g., node score) is above a threshold. Clusters and their respective nodes may be filtered using a filtering criterion. For example, the system may rank the physical domain 1 substitutes in order of how their node characteristics align with the filtering criterion. For example, the filtering criterion may be processing power, bandwidth, or memory. The system may rank the substitute nodes in order of how they align with each filtering criterion. The remaining clusters and nodes may then be outputted into the computer network in order of their respective cluster score.

For example, as referred to herein, a "filtering criterion" may be any characteristics of a node that may be used to distinguish one node from another and/or determine that two nodes have characteristics in common. In some embodiments the filtering criterion may be user selected. For example, the user may select a filtering criterion from a predetermined list on the user's device. For example, the user may select filtering criteria such as lowest cost, used items, in-stock items, minor cosmetic damage, etc. In some embodiments the filtering criterion could be based on the intrinsic features of a node such as color, size, weight, etc. In some embodiments the filtering criterion may be received from a third-party server and/or a server related to a financial services network. In some embodiments the system may receive more than one filtering criterion. In some embodiments the system may receive one filtering criterion and then filter the already filtered clusters using a new criterion.

In some embodiments, the system may include natural language processing techniques, including but not limited to Hidden Markov Models, dynamic time warping, Bidirectional Encoder Representations from Transformers (BERT) and/or neural networks. For example, the system may receive data in the form of text. The text may include a series of words. For each word of the text, the system may determine the context for each occurrence of a given word in the text. The system may then compare the determined context to user preference information (e.g., retrieved from a user profile).

In some embodiments, the system may use fuzzy logic to determine substitute nodes. For example, the system may determine two fields and/or values to be identical even though the substance of the data or value (e.g., two different spellings) is not identical. In some embodiments, the system may determine substitutes for the outputs of the topic modeling machine learning model, using fuzzy logic. The system may determine a substitute node by classifying an input (e.g., the output of the topic modeling machine learning model) as a member, with varying degrees, of at least one fuzzy set, and by applying a set of linguistic rules to the input based on the input's degrees of memberships. In some embodiments, an input may be a member of multiple overlapping fuzzy sets. For example, butter may be a member of a dairy fuzzy set and a fat fuzzy set, and these fuzzy sets may overlap. In some embodiments, an input may be a member of multiple fuzzy sets with varying degrees of membership. In some embodiments, a fuzzy set comprises the metric range that relates to a topic. For example, the high fat fuzzy set may be items with 50% fat content and above. In some embodiments, the actual metrics that define a fuzzy set may be defined using parameters established by a neural network, machine learning algorithm, an expert, etc. A fuzzy logic output may be determined by a set of linguistic rules or associations (e.g., fuzzy rules) that correspond to the input's degrees of memberships. For example, if a healthy butter substitute is needed, then use coconut oil. Fuzzy rules may fluctuate over time as new information becomes available. For example, if new products enter the market or if the features of an item change. The linguistic rules or associations may be determined by an expert, a machine learning model, etc.

In some embodiments, the system may analyze particular received data of a data structure for particular values or text using textual character recognition methods described above in order to determine substitute nodes. The data received could be associated with data describing substitute nodes and/or any other data required for the function of the embodiments described herein. Furthermore, the data could contain values (e.g., the data could be expressed in binary or any other suitable code or programming language).

In some embodiments, the system may also capture image data using a user interface's camera. In some embodiments, the camera may provide the filtering criteria or user preferences. For example, if the image data reflects the user frequently shopping at Walmart, the system may filter the clusters or nodes based on this user preference for Walmart. For example, if the image data reflects a user is inside a Walmart, the system may filter the clusters and/or nodes to reflect items in stock at the Walmart.

It should be noted that in some embodiments the system may generate recommendations and display lists of nodes that correspond to any product and/or service. For example, the system may generate a list of nodes that correspond to a product. For example, the system may receive an input that corresponds to a particular product, such as a sport utility vehicle. The system may then generate a list of nodes that correspond to a sport utility vehicle, such as the tire models, the brake disks models, the recommended oils, etc., that are compatible with a sport utility vehicle. The system may use publicly accessible product data sheets, documents from a company's website, etc., to train the topic classification and topic modeling machine learning models on a particular product or service.

In some embodiments the system may receive product or service information directly from a third-party server. For example, the system may receive training information directly from a third-party server. In some embodiments, the system may receive live inventory information from a third-party server and generate lists of nodes that correspond to a company's live inventory.

Figure 2:
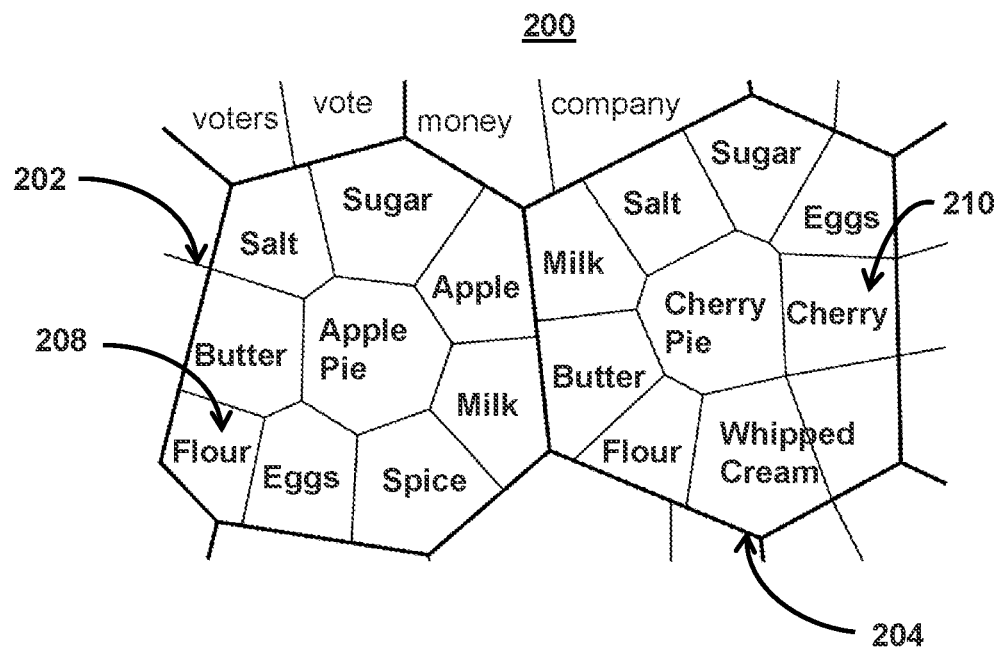
FIG. 2 shows an illustrative diagram of a cluster and a data structure for the dynamic re-clustering of nodes in computer networks using machine learning models, in accordance with one or more embodiments.
Figure 2:
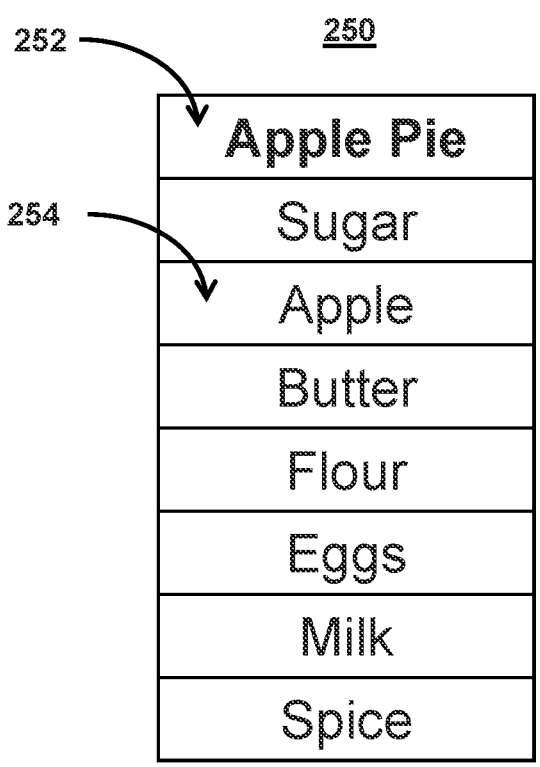

FIG. 2 shows an illustrative diagram of cluster subset 200, and data structure 250, in accordance with one or more embodiments. For example, FIG. 2 shows cluster subset 200 encompassing cluster 202 and cluster 204. Data structure 250 has a cluster 252 which encompasses associated nodes 254. A cluster may be a group of data points that are similar according to their surrounding data points. A cluster may be a group of electronically identified nodes. In some embodiments a cluster may be a collection of words. A cluster subset may encompass a plurality of clusters. A variety of cluster models may be used along with their associated algorithms. For example, cluster models may include any of the following, and their current or future equivalents, neural models, connectivity models, distribution models, density models, etc. A node is a basic data structure that contains data. In some embodiments, a node may be a word, number, or other data characteristic. In some embodiments, the nodes may be arranged in a tree structure. In some embodiments a cluster may encompass at least one node. In some embodiments, nodes may be associated with the topic of the cluster. For example, as shown in FIG. 2, cluster 202 and cluster 204 encompass a plurality of nodes 208 and 210, which are ingredients for the respective cluster topics: apple and cherry pie.

For example, in a non-limiting embodiment, a user may input "dessert" into the user interface, the first machine learning model, trained using topic classification, may output cluster 202 "apple pie" and cluster 204 "cherry pie." A second machine learning model may receive the input from the first machine learning mode and output a cluster of nodes that are associated with the cluster topics. For example, the second machine learning model may output, for the input "apple pie," a cluster of nodes: "flour," "eggs," "spice," "milk," "sugar," "salt," "butter," and "apple."

Figure 3:
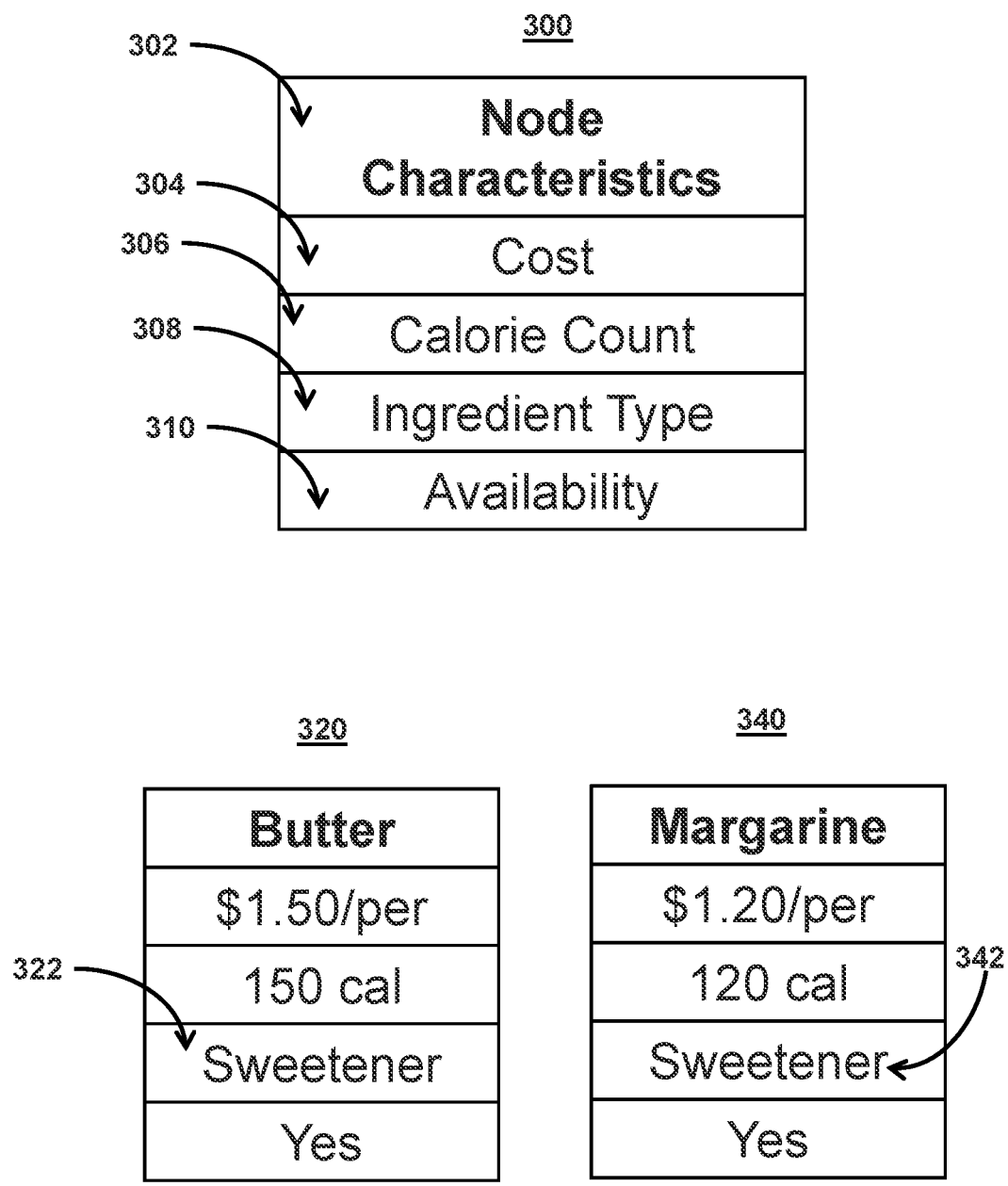
FIG. 3 shows an illustrative data structure of node characteristics used for the dynamic re-clustering of nodes in computer networks using machine learning models, in accordance with one or more embodiments.

FIG. 3 shows a node characteristics data structure 300, a node data structure for butter 320, and a node data structure for margarine 340, in accordance with one or more embodiments. In some embodiments the system may retrieve the respective node characteristics for each node in each cluster of the second cluster subset and determine available substitute nodes that correspond to each cluster of the second cluster subset using fuzzy logic. For example, the system may determine that two nodes are identical even though the substance of the data or value is not identical. For example, the system may determine that "margarine" and "lard" are members to a major degree of a fuzzy set for "fat" and may be members to a minor degree of "healthy fats." The system may then apply a linguistic rule or association based on the inputs' degrees of memberships. For example, a linguistic rule may state if a healthier substitute for "lard" is needed, then use "margarine." The system may determine membership in fuzzy sets based on the metric range that relates to a topic. To determine if an input corresponds to the metric range required for membership in a fuzzy set, the system may determine the respective node characteristics for each node in each cluster of the second cluster subset and compare the node characteristics to the fuzzy set metric range.

For example, each node in the second cluster subset may have node characteristics. Node characteristics may be intrinsic (e.g., weight, color, size, calorie count, price) or extrinsic (e.g., availability, condition, etc.). In some embodiments, the system may retrieve the node characteristics from a third-party, or they may be pre-loaded on a user interface, or they may be entered by a user, etc. In some embodiments, substitute nodes may be determined based on node characteristics. For example, the system may compare two or more clusters and their associated nodes, using node characteristics, to determine if nodes can operate as substitutes.

In some embodiments, the system may compare the node characteristics using a cluster score. The cluster score may be a measure of how similar two or more clusters are. For example, the cluster score may be any quantitative or qualitative metric for distinguishing between and/or determining a similarity of two or more clusters. For example, the system may compare the node characteristics of an output of the second machine learning model and a substitute node identified using fuzzy logic. In some embodiments the system may compare a single, or more than one node characteristic. For example, the system may compare the cost 304 and calorie count 306 of butter and margarine to determine if margarine is an adequate substitute for butter. In some embodiments the system may use statistical analysis to determine if one node is an adequate substitute for another. For example, the system may have a threshold percentage, where if the price, calorie count, etc. are not within a certain threshold of one another, the nodes cannot be substitute nodes. In some embodiments, the system may determine the aggregate score of every node in a cluster and compare clusters using the aggregate score. In some embodiments, if the aggregate score difference does not satisfy a threshold then the nodes in the respective clusters may not be viable substitutes.

In some embodiments, substitute nodes may be determined by a topic modeling machine learning model. For example, the machine learning model could determine how often two or more subtopics are present in a corpus. The system may use statistical analysis to determine if two or more subtopics are related based on how often they appear in a corpus.

In some embodiments, replacing original nodes with substitute nodes may create a new subset. For example, the first machine learning model may create a first cluster subset. The second machine learning model may create a second cluster subset. The system may generate a third cluster subset after replacing original nodes in the second cluster subset with substitute nodes. The system may create a fourth cluster subset after applying filtering criteria to the third cluster subset.

Figure 4:
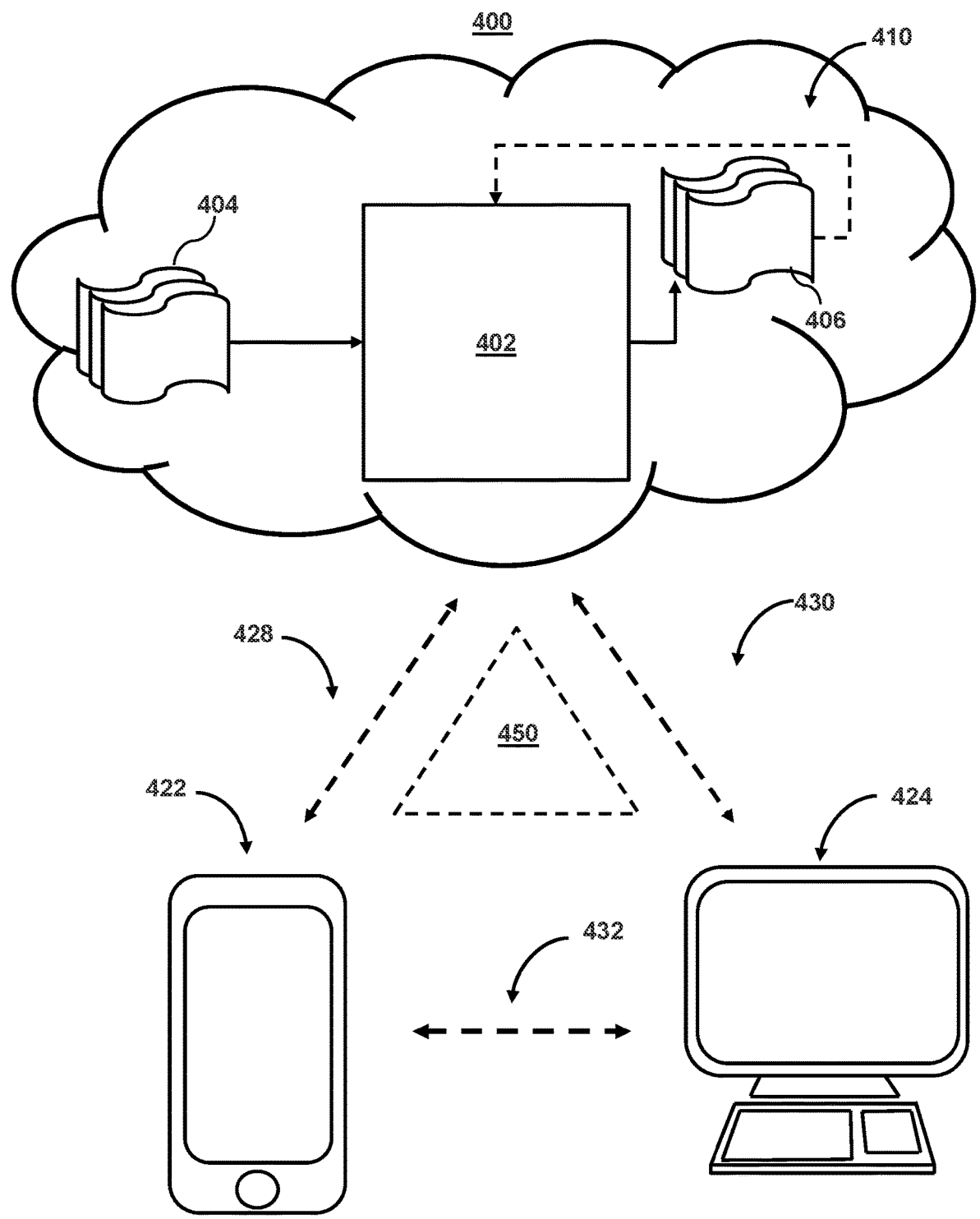
FIG. 4 shows an illustrative system for the dynamic re-clustering of nodes in computer networks using machine learning models, in accordance with one or more embodiments.

FIG. 4 shows an illustrative system for the dynamic re-clustering of nodes in computer networks using machine learning models, in accordance with one or more embodiments. FIG. 4 shows an illustrative system diagram for the use of machine learning models to re-cluster nodes in accordance with one or more embodiments. For example, system 400 may represent the components used for the dynamic re-clustering of nodes using machine learning models, as shown in FIGS. 1-3. As shown in FIG. 4, system 400 may include mobile device 422 and user interface 424 (which in some embodiments may correspond to a financial services network and secondary user interface 152 (FIG. 1)). While shown as a smartphone and personal computer, respectively, in FIG. 4, it should be noted that mobile device 422 and user interface 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of mobile device 422, those operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user interface 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user interface 424 include a display upon which to display data (e.g., as shown in FIG. 1).

Additionally, as mobile device 422 and user interface 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating alternative content.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior interactions, both actively and passively. Alternatively, or additionally, the system may act as a clearing house for multiple sources of information about the user. This information may be compiled into a cross-platform profile. For example, one or more of cloud components 410 may include a microservice and/or components thereof. In some embodiments, the microservice may be a collection of applications that each collect one or more of the plurality of variables.

Cloud components 410 may include model 402, which may comprise one or more machine learning models. Model 402 may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive a first labeled feature input, wherein the first labeled feature input is labeled with a known confidence score for the first labeled feature input (e.g., based on a collection of variables). The system may then train the first machine learning model to classify the first labeled feature input with the known confidence score.

For example, model 402 may correspond to a topic classification machine learning model. The topic classification model may use at least one supervised machine learning model to identify topics, from a predetermined topic list, that are relevant to the input. For example, the topic classification model may have a predetermined topic list, that the machine learning model uses to associate with an input data set. In some embodiments a topic may be associated with more than one input.

The topic classification model may take inputs 404 and provide outputs 406. The inputs may include multiple datasets such as a training dataset and a test dataset. Each of the plurality of datasets (e.g., inputs 404) may include data subsets related to user data, original content, and/or alternative content. Training datasets may store data such as topic patterns, opinion patterns, and key word patterns. For example, the training data may include inputs from which topics have been identified and inputs that are subject to change. The training data inputs may be linked to topics by a machine learning model, a human assisted model, or by a human. In some embodiments as inputs are being constantly added, new training data may become available, in these embodiments the machine learning model can be retrained using the new training data.

In some embodiments, outputs 406 may be fed back to model 402 as inputs to train model 402. For example, the system may receive a first labeled feature input, wherein the first labeled feature input is labeled with a known confidence score (e.g., based on a collection of variables). The system may then train the first machine learning model to classify the first labeled feature input with the known confidence score. In some embodiments, the inputs 404 may be a single dataset. The system may then generate a second data set which includes data from the first data set. The data from the second data set may be used to train the machine learning model. For example, the topic classification model may use the training data set to predict at least one output and then calculate a confidence score for this data set. The topic classification model may then compare the at least one output with the first data set which may have been filtered for topics by a human, another machine learning model, etc. In this embodiment the first data set may act as a validation set.

The topic classification model may extract unique features from training datasets, test datasets, and input data sets to create feature vectors. The topic classification model may then input the feature vectors into topic classification algorithms which may include any known, or their future equivalents, topic classification algorithms such as the naïve bayes, support vector machines, deep learning, random forest, or decision trees, etc. In some embodiments the natural language processing may be accomplished through the pre-trained bidirectional encoder representations from transformers (BERT). For example, BERT may be trained over specific training data inputs in order to determine semantic similarities or relationships between words in the context of the data inputs.

In some embodiments, the topic classification model has been trained to identify and predict topics using test datasets. Test datasets may be inputs whose topics have been identified by humans, another machine learning model, etc. The topic classification model may undergo training and test data input cycles until a threshold accuracy score is satisfied. For example, if the topic classification model fails to meet the threshold accuracy score for a topic, it may be provided more training datasets to retrain the model.

Cloud components 410 may include model 402, which may comprise one or more machine learning models. For example, model 402 may correspond to a topic modeling machine learning model. The topic modeling machine learning model may use at least one unsupervised machine learning model to determine, from an input, a set of common topics that exist within the input. For example, the topic modeling model may produce, from a corpus of text, a set of unique topics, each of which is represented by a statistical distribution of all of the words in the input corpus. The topic modeling model may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive a first labeled feature input, wherein the first labeled feature input is labeled with a known confidence score for the first labeled feature input (e.g., based on a collection of variables). The system may then train the first machine learning model to classify the first labeled feature input with the known confidence score.

In some embodiments the topic modeling model may reduce the size of an input text corpus by removing common words and stop words. Once the text corpus has been filtered, the topic modeling machine learning model may use a topic modeling algorithm, such as latent dirichlet allocation, latent semantic analysis, non-negative matrix factorization, etc., to determine the statistical distribution of words within a corpus. In some embodiments the topic modeling model may output hierarchical relationships between the topics.

In some embodiments the topic modeling model may receive a training dataset. For example, the training dataset may be a set of documents that is selected by a human, another machine learning model, etc., such that the data set is seeded with every machine discoverable topic. In this embodiment, the topic modeling model is exposed to every topic that could be discoverable through topic modeling. In some embodiments the input data may be designed using conventional sampling techniques, such as stratified sampling. For example, the topic modeling machine learning model may be provided with data training subsets that include a single topic. The data training subset may have a variety of subtopics within that topic such that the model is exposed to every subtopic that could be discoverable through topic modeling.

In some embodiments the statistical distribution is based on simple statistics. For example, a 10% chance that a word corresponds to a topic. In some embodiments, the statistical distribution is based on the relationship between topics. For example, there is a 10% chance that a topic is related to another topic.

In some embodiments, the training, test, and input data of the topic classification model may also be inputted into the topic modeling model. For example, the topic modeling model may use the known topics from the topic classification model to generate intent and topic pairs. In some embodiments the system may use multiple topic modeling and topic classification models, each with different training data sets, such that the system may output topics generated from the topic classification models into each of the topic modeling models to generate a possibly wider range of subtopics. In some embodiments the system may use an iterative approach where the output from the data modeling models is inputted into the data classification models to broaden the output topics.

In another embodiment, model 402 may update its configurations (e.g., weights, biases, or other parameters) based on the assessment of its prediction (e.g., outputs 406) and reference feedback information (e.g., user indication of accuracy, reference labels, or other information). In another embodiment, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., an incident).

For example, in some embodiments, the system may train a machine learning model (e.g., an artificial neural network) to determine known confidence scores based on a collection of variables. For example, the system may receive user data (e.g., comprising the variables and categories of variables described in FIGS. 2-3). The system may then generate a series of features inputs based on the training data. For example, the system may generate a first feature input based on training data comprising user data corresponding to a first known confidence score. The system may label the first feature input with the first known confidence score (e.g., labeling the data as corresponding to a classification of a given confidence score or likelihood).

For example, in some embodiments, the system may train a machine learning model (e.g., an artificial neural network) to determine the dynamic re-clustering of nodes in computer networks using machine learning models. For example, the system may receive a dataset with known topics and confidence scores. The system may then generate a series of outputs from a first topic classification machine learning model based on the user datasets. For example, the system may generate a confidence score based on the datasets using confidence score validation techniques. In some embodiments, the system may determine a response (e.g., particular retraining actions) corresponding to a confidence score that does not exceed a threshold confidence score. The system may then be retrained using curated training datasets.

The system may then train a machine learning model to detect the first known confidence score based on the labeled first feature input dataset. The system may also train a machine learning model (e.g., the same or different machine learning model) to detect the second known confidence score based on the labeled second feature input dataset. For example, the training process may involve initializing some random values for each of the training matrices (e.g., of a machine learning model) and attempting to predict the output of the input feature using the initial random values. Initially, the error of the model will be large, but comparing the model's prediction with the correct output (e.g., the known classification), the model is able to adjust the weights and biases values until having the model provides the required predictions.

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally or alternatively, the system may receive user data files (e.g., as a download and/or streaming in real-time or near real-time).

System 400 also includes API layer 450. For example, in some embodiments, the system may be implemented as one or more APIs and/or an API layer. In some embodiments, API layer 450 may be implemented on mobile device 422 or user interface 424. Alternatively or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web-services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside, in this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use developer portal. API layer 450 may use strong security constraints applying WAF and DDoS protection, and API layer 450 may use RESTful APIs as standard for external integration.

Figure 5:
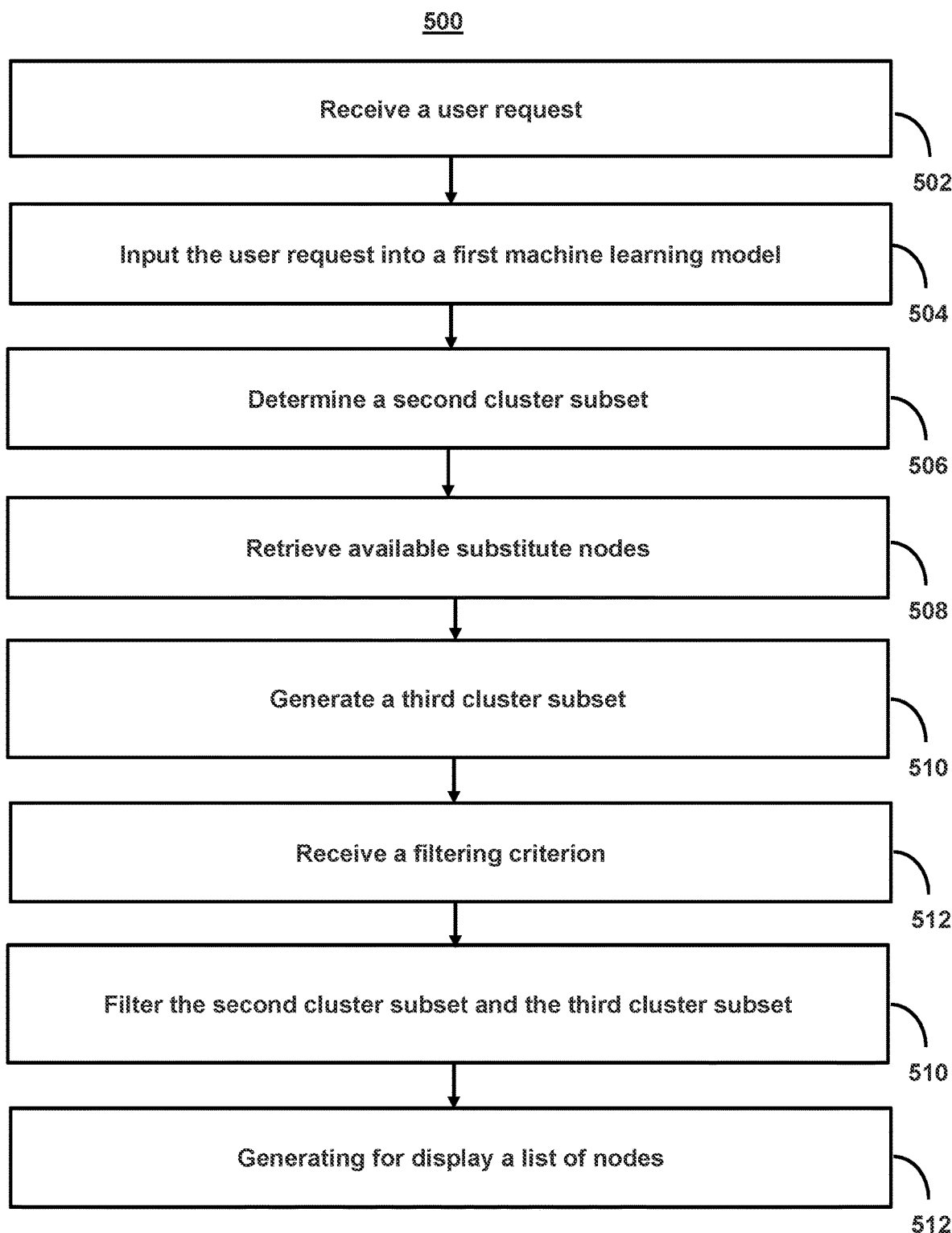
FIG. 5 shows a flowchart of the steps involved in the dynamic re-clustering of nodes in computer networks using machine learning models, in accordance with one or more embodiments.

FIG. 5 shows a flowchart of the steps involved in the dynamic re-clustering of nodes in computer networks using machine learning models, in accordance with one or more embodiments. For example, process 500 may represent the steps taken by one or more devices, as shown in FIGS. 1-4 for dynamic re-clustering of nodes.

At step 502, process 500 (e.g., using one or more components in system 400 (FIG. 4)) receives a user request. For example, the system may receive a user request from a user. The user request may have different formats, may comprise data received from different sources, and/or may represent different data types. For example, in some embodiments, the system may receive transaction data for an account corresponding to a user and generate the user request based on the user transaction data. In such cases, the user request may be received from a third-party server and/or a server related to a financial services network. For example, the system may monitor data received from the financial services network for pending and/or completed transactions. As transactions are detected, the system may trigger process 500. In some embodiments, the user request may be an input term, items in a virtual shopping cart, or previously purchased items. In such cases, the user request may be received from a user directly. For example, the system may monitor inputs into applications and/or a user device (e.g., as a background application), in response to it detecting an input (or detecting an input that meets certain criteria such as an input corresponding to an item), the system may trigger process 500. In some embodiments, the system monitors the user concurrently while a user is composing the input. In some embodiments the user request may be a detected location of a user device (e.g., detected based on global positioning data). In such cases, the user request may be triggered upon a user entering a given location. For example, the system may monitor locations of a user device and compare the location to items corresponding to, or available at, the location (e.g., based on referencing a look-up table database maintained by the system and/or a third-party), in response to detecting the location (or the items corresponding to, or available at, the location), the system may trigger process 500.

At step 504, process 500 (e.g., using one or more components in system 400 (FIG. 4)) inputs the user request into a first machine learning model. For example, the system may input the user request into a first machine learning model, where the first machine learning model is trained to determine one or more clusters of a first cluster subset that corresponds to one or more user requests. In some embodiments the first machine learning model may be a topic classification machine learning model. In these embodiments the system is trained to identify the topics that are related to the user request. For example, the system may be trained using inputs for which topics have been pre-identified with certain blocks of text, audio, etc. The pre-identified topics may be labeled by a human, by another pre-trained machine learning model, etc. In some embodiments, the system may begin by changing a user request from its native data format (e.g., alphanumeric characters representing the name of an item, a transaction, etc.) into a feature input for the first match learning model. In some embodiments the system may filter out punctuation, common words (e.g., the, and, it, or, etc.), stop words, and may remove capital letters. In some embodiments once the input has been filtered the system may generate a feature vector using contextual information. For example, the system may be able to determine that an input corresponds to a topic based on the order of the text in the input, the amount of time a user spent inputting text, etc. In some embodiments, there may be multiple first machine learning models. For example, one machine learning model may receive different training data than a second machine learning model thereby creating a lower statistical chance that the machine learning models together misidentify a topic. In some embodiments the output from a first machine learning model may be used to train other machine learning models.

At step 506, process 500 (e.g., using one or more components in system 400 (FIG. 4)) determines a second cluster subset. For example, the system may determine a second cluster subset based on an output of the first machine learning model. For example, receiving an output from the first machine learning model, the system then encodes that output into a format or an input into the second machine learning model. In some embodiments, the first topic classification machine learning model is used to generate an intent that corresponds to the user input, this intent may then be inputted into the second topic modeling machine learning model to generate intent and topic pairs. For example, after receiving an input the topic classification machine learning module may generate a set of unique topics, each of which is ranked according to a confidence score. The system may then encode that output and input it into a second topic modeling machine learning model which outputs a series of sub-topics, each of which is represented in order by a statistical distribution. The resulting output is intents and their associated topics in the form of clusters and nodes. In some embodiments, the second cluster subset is further based on a user preference for a user that transmitted the user request. For example, the system may determine that an input is contextually related to a different topic. For example, the contextual information may include metadata from another source (e.g., other users that have inputted the same content), the users location information, historical user data, the user's identity, etc.

At step 508, process 500 (e.g., using one or more components in a system 400 (FIG. 4)) retrieves available substitute nodes. For example, the system may retrieve available substitute nodes. In some embodiments, each cluster in the first cluster subset may have one or more respective original nodes determined by a second machine learning model that has a topic modeling algorithm. For example, the second machine learning model may be trained using training documents on a single known topic. The second machine learning algorithm may then output a dataset ranked by statistical distribution of subtopics that correspond to the topic of the input. In some embodiments, these subtopics are nodes. For example, the second machine learning model may output subtopics (e.g., nodes) that are ranked in order of most likely being related to the topic generated from the first topic classification machine learning model to the least likely.

In some embodiments, the system may retrieve respective node characteristics for each node in each cluster of the second cluster subset and determine the available substitute nodes corresponding to each cluster of the second cluster subset using fuzzy logic. For example, the system may generate a series of fuzzy sets. The fuzzy sets may have a metric range that correlates to a particular topic. In some embodiments, the system may determine an input corresponds to the membership criteria for a plurality of fuzzy sets, wherein the membership degrees in the plurality of fuzzy sets may all be distinct. In some embodiments, once the system has determined the degrees of membership in a plurality of fuzzy sets the system may apply a linguistic rule based on the input's memberships. The linguistic rule may take the form of an if/then rule.

In some embodiments, the machine learning model may determine the semantic similarity between two or more topics. In some embodiments, if the semantic similarity is above a threshold, the system may determine that a node is a viable substitute for another node. In some embodiments the system may receive an input dataset, the system may then generate a second dataset that is a partial replication of the first dataset. The second dataset may then be inputted into the system in order to predict at least one node set. If the predicted node set has different nodes than the nodes generated from the input data set, these nodes may be substitute nodes. In some embodiments, the system may rank the substitute nodes according to certain threshold characteristics. For example, the substitute nodes may be ranked according to their respective score for price, brand, or other node characteristics. In some embodiments, the system may determine the current domain of a user and determine the available substitute nodes based on the current domain.

At step 510, process 500 (e.g., using one or more components in a system 400 (FIG. 4)) generates a third cluster subset. For example, the system may generate a third cluster subset, wherein the third cluster subset is based on substituting one or more of the available substitute nodes with one or more nodes in one or more clusters of the second cluster subset.

At step 512, process 500 (e.g., using one or more components in a system 400 (FIG. 4)) receives a filtering criterion. For example, the system may receive a filtering criterion. The filtering criterion may have different formats, may comprise data received from different sources, and/or may represent different data types. In some embodiments, the filtering criterion may be characteristics of the nodes themselves. In some embodiments the filtering criterion may be user selected. For example, the user may select a filtering criterion from a predetermined list on the user's device. For example, the user may select filtering criterion such as lowest cost, used items, in-stock items, minor cosmetic damage, etc. In some embodiments the filtering criterion could be based on the intrinsic features of an item such as color, size, weight, etc. In some embodiments the filtering criterion may be received from a third-party server and/or a server related to a financial services network. In some embodiments the system may receive more than one filtering criterion. In some embodiments the system may receive one filtering criterion and then filter the already filtered clusters using a new criterion.

At step 514, process 500 (e.g., using one or more components in a system 400 (FIG. 4)) filters the second cluster subset and the third cluster subset. For example, the system may filter the second cluster subset and the third cluster subset based on the filtering criterion to determine a fourth cluster subset. For example, each node in the second and third clusters may be given a node score, where the node score is determined by comparing the node characteristics with the filtering criteria. For example, the filtering criteria may be inputted into a machine learning model whose training data subsets were comprised of information related to each node. The system may then output a statistical distribution that ranks each node according to the number of times the filtering criteria was displayed in the training data. In some embodiments, if the node score is not above a threshold node score the node is not included in the fourth cluster subset. In some embodiments, the system may determine a respective cluster score for each cluster of the second cluster subset and the third cluster subset and determine a threshold cluster score based on the filtering criterion and determine a fourth cluster subset based on comparing the respective cluster score for each cluster of the second cluster subset and the third cluster subset to the threshold cluster score. In some embodiments the cluster score is the aggregate of every node score in the cluster.

In the method of any preceding embodiment the system may determine respective node characteristics for each node in each cluster of the second cluster subset and the third cluster subset and determine a score based on the respective node characteristics for each node in each cluster of the second cluster subset and the third cluster subset and aggregate scores for the respective node characteristics in each respective cluster.

In some embodiments, each cluster in the first cluster subset may have one or more respective original nodes determined by a second machine learning model that has a topic modeling algorithm, and wherein the cluster of the fourth cluster subset includes an original node determined by the second machine learning model and an available substitute node.

At step 516, process 500 (e.g., using one or more components in a system 400 (FIG. 4)) generates for display a list of nodes. For example, the system may generate for display, on a user interface, a list of nodes in a cluster of the fourth cluster subset. For example, the system may display the nodes of the fourth cluster subset in order based on their respective node score. In some embodiments the user interface could be a consumer electronic device (e.g., a phone, tablet, laptop, desktop, etc.) or a third-party device (e.g., a server). In some embodiments the system may display the fourth cluster subset in groups of clusters that best correspond to multiple filtering criterion. In the method of any preceding embodiment, the system may generate, for display, on the user interface, the cluster of the fourth cluster subset, receive a user selection of the cluster, and update the user preference based on the user selection. For example, after displaying the fourth cluster subset of "tire patching kits," "bike pump mounts," and "bike pump needles" the user may select "tire patching kit;" the system may then update the user preference to minimize price for the next time the user uses the system.

In some embodiments the system may rank clusters of the fourth cluster subset based on the filtering criterion and generate for display on the user interface the clusters of the fourth cluster subset based on the ranking. For example, if the user request was for bike pump and the filtering criterion was minimizing cost, and the fourth cluster subset included clusters "tire patching kits," "bike pump mounts," and "bike pump needles" the system may generate for display the fourth cluster subset in the following order "bike pump needles," "tire patching kits," and "bike pump mounts" according to their respective ranking due to their cost.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for dynamic re-clustering of nodes in computer networks using machine learning models, the method comprising: receiving a user request; inputting the user request into a first machine learning model, wherein the first machine learning model is trained to determine one or more clusters of a first cluster subset that corresponds to one or more user requests; determining a second cluster subset based on an output of the first machine learning model; retrieve available substitute nodes; generating a third cluster subset, wherein the third cluster subset is based on substituting one or more of the available substitute nodes with one or more nodes in one or more clusters of the second cluster subset; receiving a filtering criterion; filtering the second cluster subset and the third cluster subset based on the filtering criterion to determine a fourth cluster subset; and generating for display, on a user interface, a list of nodes in a cluster of the fourth cluster subset.

2. The method of any of the preceding embodiments, wherein each cluster in the first cluster subset comprises one or more respective original nodes determined by a second machine learning model that comprises a topic modeling algorithm, and the cluster of the fourth cluster subset includes an original node determined by the second machine learning model and an available substitute node.

3. The method of any of the preceding embodiments, further comprising: retrieving respective node characteristics for each node in each cluster of the second cluster subset; and determining the available substitute nodes corresponding to each cluster of the second cluster subset based on a comparison of respective node characteristics of each of the available substitute nodes and the respective node characteristics for each node in each cluster of the second cluster subset.

4. The method of any of the preceding embodiments, wherein filtering the second cluster subset and the third cluster subset based on the filtering criterion to determine a fourth cluster subset, further comprises: determining a respective cluster score for each cluster of the second cluster subset and the third cluster subset; determining a threshold cluster score based on the filtering criterion; and determining the fourth cluster subset based on comparing the respective cluster score for each cluster of the second cluster subset and the third cluster subset to the threshold cluster score.

5. The method of any of the preceding embodiments, wherein determining the respective cluster score for each cluster of the second cluster subset and the third cluster subset, further comprises: determining a respective node characteristic for each node in each cluster of the second cluster subset and the third cluster subset; determine a score based on the respective node characteristic for each node in each cluster of the second cluster subset and the third cluster subset; and aggregate scores for the respective node characteristics in each respective cluster.

6. The method of any of the preceding embodiments, wherein the second cluster subset is further based on a user preference for a user that transmitted the user request.

7. The method of any of the preceding embodiments, further comprising: generating for display, on the user interface, the cluster of the fourth cluster subset; receiving a user selection of the cluster; and updating the user preference based on the user selection.

8. The method of any of the preceding embodiments, further comprising: receiving user transaction data for an account corresponding to a user; and generating the user request based on the user transaction data.

9. The method of any of the preceding embodiments, further comprising: ranking clusters of the fourth cluster subset based on the filtering criterion; and generating for display, on the user interface, the clusters of the fourth cluster subset based on the ranking.

10. The method of any of the preceding embodiments, further comprising: determining a current domain of a user; and determining the available substitute nodes based on the current domain.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for dynamic re-clustering of nodes in computer networks using machine learning models, the system comprising:
   storage circuitry configured to:
      store a first cluster subset, wherein each cluster of computing devices in the first cluster subset comprises one or more respective original nodes determined by a first machine learning model that comprises a topic modeling algorithm;
      store a second machine learning model, wherein the second machine learning model is trained to determine one or more clusters of computing devices of the first cluster subset that corresponds to one or more user requests; and
   control circuitry configured to:
   receive a user request;
   input the user request into the second machine learning model to determine a second cluster sub set;
   retrieve respective node characteristics for each node in each cluster of computing devices of the second cluster subset;
   retrieve available substitute nodes;
   determine the available substitute nodes corresponding to each cluster of computing devices of the second cluster subset based on a comparison of respective node characteristics of each of the available substitute nodes and the respective node characteristics for each node in each cluster of the second cluster subset;
   generate a third cluster subset, wherein the third cluster subset is based on substituting one or more of the available substitute nodes with one or more nodes in one or more clusters of computing devices of the second cluster subset;
   receive a filtering criterion;
   filter the second cluster subset and the third cluster subset based on the filtering criterion to determine a fourth cluster subset;
   input/output circuitry configured to:
   generate for display, on a user interface, a list of nodes in a cluster of computing devices of the fourth cluster subset.

2. A method for dynamic re-clustering of nodes in computer networks using machine learning models, the method comprising:
   receiving a user request;
   inputting the user request into a first machine learning model, wherein the first machine learning model is trained to determine one or more clusters of computing devices of a first cluster subset that corresponds to one or more user requests;
   determining a second cluster subset based on an output of the first machine learning model;
   retrieve available substitute nodes;
   generating a third cluster subset, wherein the third cluster subset is based on substituting one or more of the available substitute nodes with one or more nodes in one or more clusters of computing devices of the second cluster subset;
   receiving a filtering criterion;
   filtering the second cluster subset and the third cluster subset based on the filtering criterion to determine a fourth cluster subset; and
   generating for display, on a user interface, a list of nodes in a cluster of computing devices of the fourth cluster subset.

3. The method of claim 2, wherein each cluster in the first cluster subset comprises one or more respective original nodes determined by a second machine learning model that comprises a topic modeling algorithm, and the cluster of the fourth cluster subset includes an original node determined by the second machine learning model and an available substitute node.

4. The method of claim 2, further comprising:
   retrieving respective node characteristics for each node in each cluster of the second cluster subset; and
   determining the available substitute nodes corresponding to each cluster of the second cluster subset based on a comparison of respective node characteristics of each of the available substitute nodes and the respective node characteristics for each node in each cluster of the second cluster subset.

5. The method of claim 2, wherein filtering the second cluster subset and the third cluster subset based on the filtering criterion to determine a fourth cluster subset, further comprises:
   determining a respective cluster score for each cluster of the second cluster subset and the third cluster subset;
   determining a threshold cluster score based on the filtering criterion; and determining the fourth cluster subset based on comparing the respective cluster score for each cluster of the second cluster subset and the third cluster subset to the threshold cluster score.

6. The method of claim 5, wherein determining the respective cluster score for each cluster of the second cluster subset and the third cluster subset, further comprises:
   determining a respective node characteristic for each node in each cluster of the second cluster subset and the third cluster subset;
   determine a score based on the respective node characteristic for each node in each cluster of the second cluster subset and the third cluster subset; and
   aggregate scores for the respective node characteristics in each respective cluster.

7. The method of claim 2, wherein the second cluster subset is further based on a user preference for a user that transmitted the user request.

8. The method of claim 7, further comprising:
   generating for display, on the user interface, the cluster of the fourth cluster subset;
   receiving a user selection of the cluster; and
   updating the user preference based on the user selection.

9. The method of claim 2, further comprising:
   receiving user transaction data for an account corresponding to a user; and
   generating the user request based on the user transaction data.

10. The method of claim 2, further comprising:
    ranking clusters of the fourth cluster subset based on the filtering criterion; and
    generating for display, on the user interface, the clusters of the fourth cluster subset based on the ranking.

11. The method of claim 2, further comprising:
    determining a current domain of a user; and
    determining the available substitute nodes based on the current domain.

12. A non-transitory, computer-readable medium for dynamic re-clustering of nodes in computer networks using machine learning models comprising instructions that when executed by one or more processors cause operations comprising:
    receiving a user request;
    inputting the user request into a first machine learning model, wherein the first machine learning model is trained to determine one or more clusters of computing devices of a first cluster subset that corresponds to one or more user requests;
    determining a second cluster subset based on an output of the first machine learning model;
    retrieve available substitute nodes;
    generating a third cluster subset, wherein the third cluster subset is based on substituting one or more of the available substitute nodes with one or more nodes in one or more clusters of computing devices of the second cluster subset;
    receiving a filtering criterion;
    filtering the second cluster subset and the third cluster subset based on the filtering criterion to determine a fourth cluster subset; and
    generating for display, on a user interface, a list of nodes in a cluster of computing devices of the fourth cluster subset.

13. The non-transitory, computer-readable medium of claim 12, wherein each cluster in the first cluster subset comprises one or more respective original nodes determined by a second machine learning model that comprises a topic modeling algorithm, and the cluster of the fourth cluster subset includes an original node determined by the second machine learning model and an available substitute node.

14. The non-transitory, computer-readable medium of claim 12, wherein the instructions further cause operations comprising:
    retrieving respective node characteristics for each node in each cluster of the second cluster subset; and
    determining the available substitute nodes corresponding to each cluster of the second cluster subset based on a comparison of respective node characteristics of each of the available substitute nodes and the respective node characteristics for each node in each cluster of the second cluster subset.

15. The non-transitory, computer-readable medium of claim 12, wherein filtering the second cluster subset and the third cluster subset based on the filtering criterion to determine a fourth cluster subset, further comprises:
    determining a respective cluster score for each cluster of the second cluster subset and the third cluster subset;
    determining a threshold cluster score based on the filtering criterion; and
    determining the fourth cluster subset based on comparing the respective cluster score for each cluster of the second cluster subset and the third cluster subset to the threshold cluster score.

16. The non-transitory, computer-readable medium of claim 15, wherein determining the respective cluster score for each cluster of the second cluster subset and the third cluster subset, further comprises:
    determining a respective node characteristic for each node in each cluster of the second cluster subset and the third cluster subset;
    determine a score based on the respective node characteristic for each node in each cluster of the second cluster subset and the third cluster subset; and
    aggregate scores for the respective node characteristics in each respective cluster.

17. The non-transitory, computer-readable medium of claim 12, wherein the second cluster subset is further based on a user preference for a user that transmitted the user request.

18. The non-transitory, computer-readable medium of claim 17, wherein the instructions further cause operations comprising:
    generating for display, on the user interface, the cluster of the fourth cluster subset;
    receiving a user selection of the cluster; and
    updating the user preference based on the user selection.

19. The non-transitory, computer-readable medium of claim 12, wherein the instructions further cause operations comprising:
    receiving user transaction data for an account corresponding to a user; and
    generating the user request based on the user transaction data.

20. The non-transitory, computer-readable medium of claim 12, wherein the instructions further cause operations comprising:
    ranking clusters of the fourth cluster subset based on the filtering criterion; and
    generating for display, on the user interface, the clusters of the fourth cluster subset based on the ranking.

* * * * *